E. H. BRISTOL.
RECORDING PRESSURE GAGE.
APPLICATION FILED APR. 12, 1906.
966,790.
Patented Aug. 9, 1910.
2 SHEETS—SHEET 2.
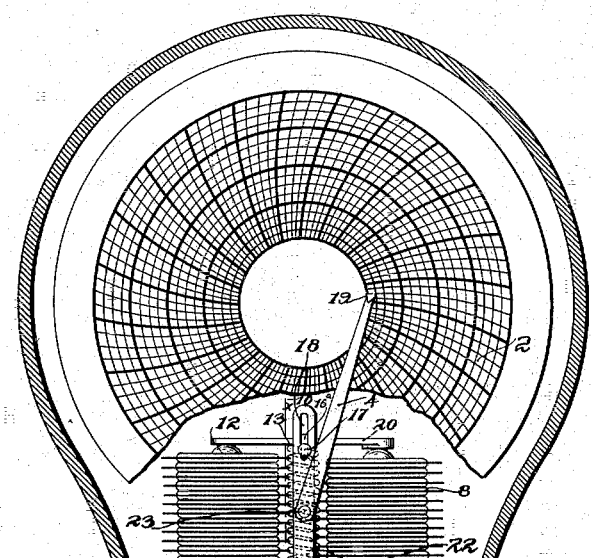
Witnesses
Adolph C. Kaiser
Robert H. Kammler
Inventor
Edgar H Bristol
By Emery & Booth,
Atty's.

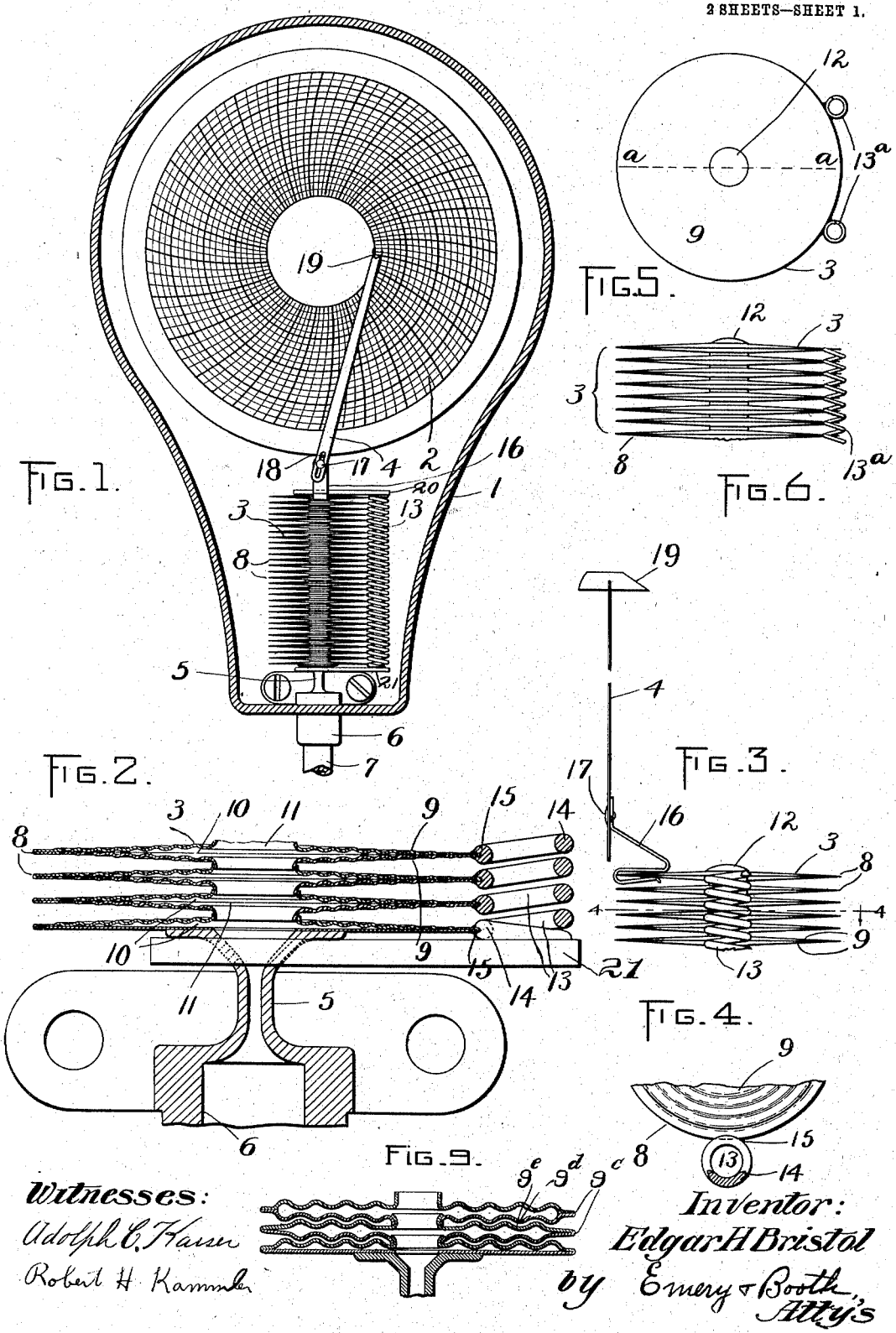

UNITED STATES PATENT OFFICE.

EDGAR H. BRISTOL, OF NAUGATUCK, CONNECTICUT, ASSIGNOR TO THE INDUSTRIAL INSTRUMENT COMPANY, OF WATERBURY, CONNECTICUT, A CORPORATION OF CONNECTICUT.

RECORDING PRESSURE-GAGE.

966,790.

Specification of Letters Patent.

Patented Aug. 9, 1910.

Application filed April 12, 1906. Serial No. 311,255.

*To all whom it may concern:*

Be it known that I, EDGAR H. BRISTOL, a citizen of the United States, residing at Naugatuck, in the county of New Haven, State of Connecticut, have invented an Improvement in Recording Pressure-Gages, of which the following description, in connection with the accompanying drawings, is a specification, like characters on the drawings representing like parts.

My invention relates to devices for indicating and recording pressures or variations thereof and more particularly to a type of instrument comprising an expansion tube made up of expansible sections, one end of said tube being secured while the other is free to move and having a pointer adapted to move over the face of a graduated dial. The tendency of the tube is to elongate or contract by increase or diminution of internal pressure and to restrain the tendency to change of length, one side of the tube is provided with a flat strip of metal suitably secured thereto while permitting the elongation of the opposite unrestrained side, thereby producing a resultant deflection of the free end of the tube and of the pointer carried thereby, the movement of which relative to the graduations of the chart is utilized to indicate the pressure. In instruments of this type, as hitherto constructed, the restraining strip has been a flat metal band secured to the strip by solder necessarily applied on its inner side next to the tube. The solder being applied as described is found to interfere with the resiliency of the strip and to impair the efficient action thereof and consequently of said tube so that after it has been deflected a number of times it acquires a slight permanent deflection technically called a "set" and, while easily deflected under varying pressures, a return to normal position under normal pressure is not readily obtained.

One of the aims of my invention is to overcome this objection and at the same time provide a sensitive instrument that will indicate and record all variations of pressure without appreciable error. This and other features of my invention, however, will be best understood and more thoroughly appreciated from the following description, when taken in connection with the accompanying drawings of an instrument embodying one form of my invention, its scope being more particularly pointed out in the appended claims.

Referring to the drawings,—Figure 1 is a front elevation of a complete instrument selected for purposes of illustration; Fig. 2, an enlarged sectional detail of the lower end of the expansion tube, to show the manner of securing the flexible restraining coil thereto; Fig. 3, an enlarged detail in elevation of the right side of the upper end of the expansion tube, to show the restraining coil, the adjustable inking pointer, and the means for attaching it to said tube; Fig. 4, an enlarged sectional detail of the coil and the adjacent edge of the diaphragm connected therewith, taken on the line 4—4, Fig. 3; Fig. 5, a plan of a modification in which two coils are used; Fig. 6, a front elevation of the top thereof, the lower part of the coil being omitted; Fig. 7, an elevation of a differential gage or recorder in which a modified form of tube is used; Fig. 8, a vertical sectional detail of one of the tubes, to show the parallel corrugations; Fig. 9, a similar view of a modification in which the concentric corrugations of adjacent sections interlock; Fig. 10, a vertical section on line 10—10, Fig. 7, with parts broken away to show the attaching end of the pointer or pen arm; and Fig. 11 is a plan of a detail, on a somewhat smaller scale, showing a differential pressure tube employing a plurality of restraining coils.

In the embodiment of my invention illustrated the instrument comprises a suitable case, 1, to receive the pressure recording mechanism composed of a chart 2, rotatably secured upon the central spindle of a clock or clockwork (not shown), the pressure expansion tube 3, and its inking pointer or pen arm 4. At its lower end the tube 3 has a head 5 (Figs. 1 and 2), provided with securing means to support it in an upright position within said case, said head having an opening therethrough and a nipple 6, communicating therewith and receiving the pipe 7, which is connected to any fluid containing receptacle, the pressure of which is to be indicated or recorded. As herein shown (see Fig. 2) the expansion tube comprises a plurality of expansible diaphragm sections 8, each formed of two circular corrugated diaphragms or disks 9, each provided with a central opening 11. The edges of these diaphragms are suitably united to form a series of expansion chambers 10, each communicating with the others through the central openings 11, and constituting together a continuous tube. A suitable number of sections having been united in this way the upper opening in the tube is closed by a cap or button 12, the lower section formed with or united to the head 5, the opening 11 communicating therewith and with that of said nipple 6, and the pipe 7.

Instead of using the usual flat metallic strip for restraining the elongation of one side of the tube while the opposite side is free to elongate to produce the desired deflection, I have found it advantageous to provide restraining means having curved attaching elements interposed between each pair of sections 8, of which the tube is composed, the curved formation of said elements increasing the resiliency of the tube as a whole and preventing any tendency to "set." In the present embodiment of my invention the restraining means employed comprises one or more curved springs, a single helical coil 13, being shown in Figs. 1 and 4, and two such coils 13ª in Figs. 5 and 6 though any other number could be employed with efficient results, my invention obviously not being limited in this respect. The coil spring 13 is longitudinally arranged along one side of the expansion tube, the outer surface of each convolution 14 of the coil having a shallow recess or groove 15, in which the adjacent edge of the diaphragm section 8, is suitably secured, as by solder; said grooves being cut transversely or at right angles to the length of the coil in that portion of each convolution adjacent the tube. The metal of which said coil 13, is made is preferably the same as that of the tube 3, or at least one having approximately the same coefficient of expansion through the usual range of temperature to which the tube may be subjected, so that its deflections will be uniform for the same differences or changes of pressure. The convolutions of said coil spring 13, when not subjected to external forces are normally separated a distance equal to that between the edges of the diaphragm sections, so that said coil and the tube connected therewith will normally be vertical.

By using a coil spring greater durability and resiliency are secured than is possible with a flat strip and sufficient length of resilient metal is interposed between the sections of the tube to give the effect of spring hinges, enabling one to be pivotally connected with another, furnishing additional elasticity to the expansion tube to cause or permit it always to return to normal position, when the pressure which caused a deflection thereof returns to the normal, there being no tendency toward a permanent deflection or set of the tube or the restraining coil, the responsiveness of the tube or strip not being limited in any way.

By arranging a plurality of connections, like coils 13ª, in the present instance, shown as extending continuously from top to bottom at one side of the tube, a more perfect balance and action is obtained than would be the case if a single restraining spring or coil were used, but my invention of course is not limited in this respect. When two coils 13ª are used, they may each be made lighter and smaller than the single coil 13, and they are preferably arranged at right angles to the planes of the diaphragms or parallel with the length of the tube, said spring being of similar construction to spring 13 except that the peripheries of the convolutions are directly secured to those of the diaphragms, the recesses in the surfaces of the convolutions being omitted. These coils also act as spring hinges between the sections of the tube and have a tendency to limit the deflection of the tube to a vertical plane a—a, Fig. 5, parallel with the face of the chart 2, and passing through the axis of the tube, the axes of the coil springs being equally distant from said plane to secure such effect. These coils 13, 13ª each present curved metallic elements between the sections which are not only flexible but are also expansible and contractible in the direction of their length but are made stiff enough to yield less readily in that direction than the tube, so that in the expansion of the tube their natural tension restrains the elongation of one side of the tube to produce a deflection thereof as described.

In operation any variation between the external pressure and that within the tube causes a contraction or expansion of the several sections and consequently of said tube in the direction of its length. As elongation at one side of the tube is restrained by the coil spring 13, or by the coil springs 13ª, the elongation of the opposite unrestrained side causes the upper or free end of the tube to deflect toward or from the restrained side of the tube and this movement is utilized to indicate and record the pressure to which said deflection is due, an inking pointer or pen arm 4 being provided, and carried by the free end of the tube, its proper position being at the front of the tube so that it will be deflected in the plane of the chart as described. While any desired type of inking pointer may be used, that herein shown comprises an adjustable spring clip 16, adapted to embrace the edge of one of the diaphragm sections and by which it is attached thereto. The upper part of said clip 16 is bent inwardly toward the chart, its end having a headed stud 17, secured in a longitudinal slot 18 at the lower end of the inking pointer, and fitting closely therein to form a well known type of friction joint, so that the sections or parts of the pointer may be held in desired adjustment either angularly or longitudinally, permitting the ink carrier or pen 19, at the upper end of said pointer 4 to be placed in any desired position upon the chart or dial 2.

Fig. 7 represents a differential pressure recorder which has two tubes supported upon a similar head $5^a$, having two nipples 6, each connected in the usual manner to their respective pressure vessels or receptacles, the restraining means therefor in the present instance comprising a single coil spring $13^x$, though obviously a plurality of such coils, $13^x$, Fig. 11, may be used and are within the scope of my invention. The rims of the sections 8 are secured to opposite sides of the coil $13^x$, in the present instance, by soldering them within the horizontal grooves $15^a$ cut on the opposite sides of each convolution. These tubes are equally expanded as long as the pressures remain equal in the pressure receptacles with which they are connected; but as the pressure of one exceeds the other, the greater expansion of its connected pressure tube produces a corresponding deflection of the tube or tubes through the restraining effect produced by the coil $13^x$. As the unrestrained outer and opposite rims or edges of the sections in all tubes of this type, as hitherto constructed, tend to separate more than the restrained edges, as pressure is admitted to the tubes, instantaneous deflection thereof may not follow until such separation has been effected, which is not an advantageous or beneficial effect and should be avoided. I have overcome this tendency by rigidly connecting the top and bottom of the restraining coil with the upper and lower sections of each tube, by means of strips or plates, respectively numbered 20 and 21 in the drawings (Figs. 1 and 7). These strips 20, 21 are preferably soldered to the ends of the spring or springs and to top and bottom of the tube or tubes, accordingly as one or two tubes are employed. These strips effectually prevent the expansible sections from separating, fan-like, one from the other, at their unrestrained sides, except as the coil is deflected, so that the pressures are entirely utilized in producing deflection to move the pointer or inking arm without any loss of motion. The pointer in this case, see Fig. 10, is provided with a usual spring clip, $16^a$, for attachment to the tube, being shaped to embrace the upper truss frame or strip 20, and secured thereto in any desirable manner. As herein shown, the pen arm has an intermediate section 22, united to the pen arm proper by a second friction joint 23, said section 22 being bent back upon itself that its upper end may overlie the chart 2, which is received into the loop 24, of the pointer. This arrangement permits placing the upper portion of the tube behind said chart 2, and using a much shorter casing $1^a$, which is desirable, since it cheapens the cost of production and provides a more compact instrument. For this reason I have devised the forms of expansible sections illustrated by Figs. 8 and 9, the former composed of diaphragms $9^a$, each having parallel concentric corrugations $9^b$, permitting adjacent sections to be placed nearer together longitudinally and providing a shorter tube to produce a required deflection than when the sections are not fitted together in this manner, as in the usual type of tube 3 (Fig. 1). In the other form (Fig. 9), the concentric corrugations of each diaphragm $9^c$ occupy a different position radially to that occupied by those of the adjacent sections so that said sections may be placed relatively closely together, as shown in Fig. 9, the convex faces $9^d$ of one fitting with the concave depressions $9^e$ of the adjacent sections and vice versa. In each of these forms, the sections may be said to interlock one with the other, thereby producing a much shorter tube than those in common use, the remaining details of construction being similar to those already described.

The differential gage or recorder (Fig. 7) operates upon the same principle and in the same manner as the single tube with this exception; that while the single tube operates as soon as a difference of pressure exists between the outer and inner surfaces thereof, the differential requires in addition thereto, a difference between the pressures to which each tube is subjected. Obviously, as long as the pressures to which the tubes are subjected remain equal, each tube is expanded equally and the restraining coil is equally affected thereby, so that no deflection is produced, but as the pressure of one tube varies from the other, the tube subjected to the greater internal pressure will be expanded more than the other, causing its deflection and the resulting deflection of the restraining coil and the pointer or marker carried thereby.

The chart 2, may be rotated at any desired rate, preferably once in twenty-four hours, and is graduated with radial arcs and concentric circles, the divisions thereof respectively corresponding to pressures and hours of the day. The pen 19 carries suitable inking material and traces a line upon the chart corresponding to the varying pressure within the tube 6, pipe 7, and vessel to which the latter is connected, said line being continuous and constituting a complete record of the pressure and its fluctuations for the twenty-four hours or day.

The instruments herein described and illustrated are adapted for use wherever pressures are to be indicated or recorded; it being equally immaterial whether they are used for or with steam, gas, air, or other fluid, or whether used to record pressures above that of the atmosphere or for vacuums. They are also equally adapted to record changes in external pressure by maintaining the internal pressure constant.

While in the embodiment illustrated I have shown coils or springs extending from top to bottom of the tube and operating in the same manner as the springs 13 or 13ª, it is obvious that my invention is not limited to the specific embodiment, its details of construction or arrangement of parts herein selected for purposes of illustration only, but that the same may be suitably modified within wide limits without departing from the spirit and scope thereof.

Claims:

1. The combination in a pressure indicator of a pressure tube provided with a series of expansible sections, restraining means therefor, comprising a curved attaching element extending from top to bottom of the tube and connected with a plurality of said sections, an arm connected with said tube for the purpose described.

2. The combination in a pressure indicator of a pressure tube provided with a series of expansible sections, restraining means therefor comprising an attaching element curved transversely relative to the axis of the tube and connected with a plurality of said sections.

3. In a pressure indicator, an expansion tube provided with a series of expansible sections and restraining means therefor comprising a plurality of curved attaching elements arranged longitudinally at one side of said tube and connected with a plurality of said sections.

4. In a pressure indicator, an expansion tube provided with a series of expansible sections and means for restraining the elongation of one side of the tube, said means comprising an attaching element curved transversely adjacent the edges of adjoining sections of said tube and connected therewith.

5. A tube comprising a series of expansive sections and restraining means therefor, the latter including a plurality of curved attaching elements each connected with a plurality of said sections, the length of each between the sections to which it is connected, exceeding the distance between the latter.

6. A differential pressure gage comprising a plurality of pressure tubes having means for connection with different pressure receptacles and restraining means interposed between and connected with the opposing and adjacent portions of said tubes and arranged longitudinally thereon to produce simultaneous deflection thereof upon variation in the pressure to which said tubes are subjected.

7. In a differential pressure gage, a plurality of pressure tubes each comprising a series of expansible sections, and restraining means interposed between and connected with the opposing or adjacent edges of a plurality of the sections of each tube and comprising a device presenting a length of metal between its points of connection with each of said tubes greater than the distance between said points for producing a simultaneous deflection of said tubes.

8. A pressure tube comprising a series of expansible diaphragm sections, a restraining device arranged at one side of said tube, and truss means connecting the central portions of said tube with said device to prevent separation of said sections at the unrestrained sides or edges thereof and for causing simultaneous deflections of said tube and said device.

9. A pressure tube comprising a series of expansible sections, a restraining device arranged at one side of said tube and rigid connections comprising the bars 20 and 21 between said device and sections to prevent separation of the tube sections adjacent their unrestrained edges without producing simultaneous deflection of said device and said tube.

10. A pressure tube comprising a series of expansible sections, each having a corrugated surface, the corrugations of one section fitting the corrugations of adjacent sections thereof, permitting the sections to be arranged close together.

11. A pressure tube comprising a series of expansible diaphragm sections each composed of diaphragms provided with concentric corrugations, the elevations and depressions of the diaphragms of one section occupying a different peripheral position from those of the adjacent sections to permit said sections to be placed close together.

12. In a pressure indicator, the tube 3 provided with expansible sections 8 and one or more restraining coils 13 connected with the edges of a plurality of said sections.

13. In a pressure indicator, a series of connected expansible sections forming a continous tube and a restraining device for one side of and connected with a plurality of said sections having a length, between its points of attachment, greater than the distance between said points.

In testimony whereof, I have signed my name to this specification, in the presence of two subscribing witnesses.

EDGAR H. BRISTOL.

Witnesses:
ROBERT H. KAMMLER,
SIDNEY F. SMITH.